F. J. GOODIE.
NUT LOCK.
APPLICATION FILED JUNE 8, 1921.
1,411,720.
Patented Apr. 4, 1922.
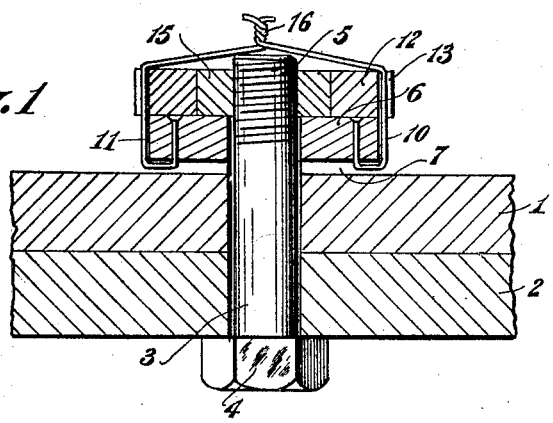
Fig. 1
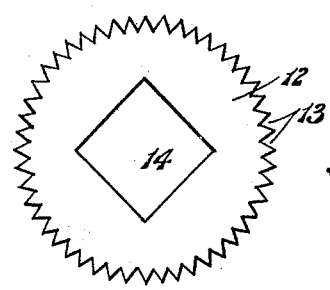
Fig. 2.
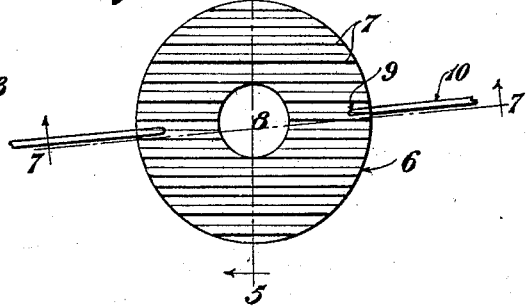
Fig. 3.
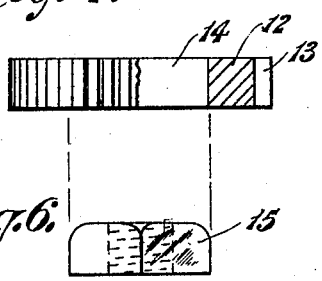
Fig. 4.
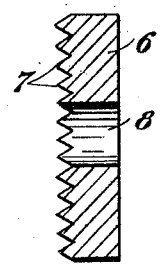
Fig. 5.
Fig. 6.
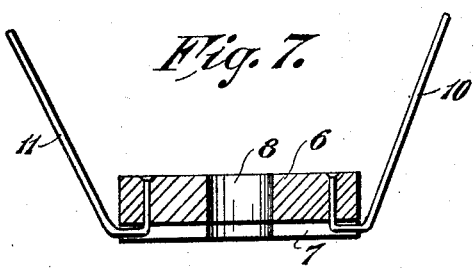
Fig. 7.
INVENTOR,
Fred J. Goodie,
BY
Harry W. Bowen.
ATTORNEY.

UNITED STATES PATENT OFFICE.

FRED J. GOODIE, OF SPRINGFIELD, MASSACHUSETTS, ASSIGNOR OF ONE-HALF TO BURT W. DECATUR, OF SPRINGFIELD, MASSACHUSETTS.

NUT LOCK.

1,411,720.  Specification of Letters Patent.  Patented Apr. 4, 1922.

Application filed June 3, 1921. Serial No. 475,858.

*To all whom it may concern:*

Be it known that I, FRED J. GOODIE, a subject of the King of Great Britain, residing at Springfield, in the county of Hampden and Commonwealth of Massachusetts, have invented certain new and useful Improvements in Nut Locks, of which the following is a specification.

This invention relates to improvements in nut locks, and it has for one of its objects to rigidly and firmly retain a nut permanently in place on the end of the bolt after it has been firmly tightened, or turned down on the thread in the usual manner.

The invention, in general, comprises a serrated plate for engaging the piece to be held in place or clamped, tie wires connected thereto, a plate having an opening to receive the nut, and for holding the tie wires in place after the ends are twisted together, as will be fully described.

Nut locks, as far as I am aware, are as a rule expensive to construct and frequently require renewal of parts when they work loose.

In my improvement the parts can be repeatedly used without renewal, and will effectively maintain the nut in place after being turned down onto the piece to be clamped.

Referring to the drawings:

Fig. 1 is a sectional view showing the parts in an assembled position.

Fig. 2 is a plan view of the nut and wire holding piece.

Fig. 3 is a bottom plan view of the serrated or corrugated piece to which the tie wires are attached and showing the bolt receiving hold and the roughened surface or serrations which engage the piece to be clamped.

Fig. 4 is an edge view of the nut and wire holding plate.

Fig. 5 is a sectional view on the line 5—5 of the serrated plate.

Fig. 6 is a side view of the nut.

Fig. 7 is a sectional view on the line 7—7 of Fig. 3 showing the tie wires attached to the serrated plate.

Referring to the drawings in detail: 1 and 2 may represent, for example, two pieces to be secured together, 3 the bolt of usual construction having the head 4 and thread 5. 6 designates a plate, or disc shaped piece, having the corrugations or sharp ridges 7 on one of its faces, and the bolt receiving opening 8 therethrough. This plate is formed with small openings 9 to receive the inner ends of the tie wires 10 and 11. 12 designates a plate having its edge formed with V-shaped recesses or notches 13 in its edge to receive and hold in place the two tie wires 10 and 11, as shown in Fig. 1. 14 is an opening in the plate 12 to receive the nut 15 after the same has been turned down onto the corrugated plate 6.

The parts are assembled as follows:

The bolt 3 is inserted in the openings of the pieces 1 and 2. The plate 6 is then placed on the bolt with the corrugations 7 engaging the upper or outer surface of the piece 1. The nut 15 is then turned down firmly against the plate 6, causing the corrugations 7 to imbed or dent themselves into the piece 1. Next the plate 12 is placed over the nut 15 so that it may enter the opening 14. The tire wires 10 and 11 are now carried or brought up and seated in two of the oppositely located V-shaped notches 13, as shown. Their free ends are then twisted together as indicated in Fig. 1 at 16.

The nut 15, of course, cannot now be moved so as to loosen, by reason of its being held in place by the plate 12, which, in turn, is held in place by the tie wires that are connected to the fixed plate or piece 6.

It will be seen that when the free ends of the tie wires are twisted together they will be firmly sealed in the V-shaped notches 13, as is readily understood. It is also evident that the tie wires will prevent rotary displacement of the plates 6 and 12, as well as force them firmly against each other. My device is therefore simple in construction, easy to install, and efficient in operation. It is, of course, obvious that various changes and substitutions may be made in the device, but the disclosure is understood to include any obvious equivalents.

What I claim is:

1. A nut lock construction, comprising in combination with a bolt and its thread, of a plate formed with serrations on one of its surfaces to engage the surface to be clamped, tie devices connected thereto, a plate having an opening to receive the nut and having its edge formed with notches to receive the tie devices, said tie devices being designed to be secured together at their free ends to retain the same in the notches.

2. A nut lock device comprising a plate having an opening to receive the bolt and a roughened surface to engage the piece to be retained in place, a second plate having a roughened edge and an opening to receive the nut of the bolt, and means including the wires connected to the first plate and engaging the roughened edge of the second plate to prevent the nut from becoming loose, as described.

3. A nut lock device comprising in combination with a bolt and its nut, of a plate on the bolt and having a roughened surface through which the bolt passes, said plate having holes to receive the tie wires, a second plate on the bolt to receive the nut and having recesses or notches to receive the tie wires, said wires having their free ends secured together, whereby the nut will be held against movement, and the plate with a roughened surface will be prevented from rotary movement on the bolt, as described.

FRED J. GOODIE.